United States Patent
Zhang et al.

(10) Patent No.: US 6,686,079 B2
(45) Date of Patent: Feb. 3, 2004

(54) FUEL CELL FOR DOWNHOLE POWER SYSTEMS

(75) Inventors: Wenlin Zhang, Missouri City, TX (US); Donald E. Hensley, Sugar Land, TX (US); Kenneth L. Havlinek, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 268 days.

(21) Appl. No.: 09/854,947

(22) Filed: May 14, 2001

(65) Prior Publication Data

US 2002/0034668 A1 Mar. 21, 2002

Related U.S. Application Data

(60) Provisional application No. 60/204,676, filed on May 17, 2000.

(51) Int. Cl.$^7$ .............................................. H01M 8/04
(52) U.S. Cl. .............................. 429/25; 429/30; 429/34; 429/38
(58) Field of Search ................................. 429/30–39, 25

(56) References Cited

U.S. PATENT DOCUMENTS

| | | | |
|---|---|---|---|
| 3,664,442 A | 5/1972 | Rosser et al. ................ 175/231 |
| 3,664,873 A | 5/1972 | Buswell et al. ............ 136/86 C |
| 3,665,955 A | 5/1972 | Conner, Sr. .................. 137/495 |
| 4,110,628 A | 8/1978 | Paull et al. .................. 290/1 R |
| 4,128,701 A | 12/1978 | Maricle ........................ 429/21 |
| 4,250,230 A | 2/1981 | Terry ............................ 429/12 |
| 4,808,037 A | 2/1989 | Wade et al. ................. 405/226 |
| 4,817,711 A | 4/1989 | Jeambey ...................... 166/248 |
| 4,876,162 A | * 10/1989 | McElroy ................... 429/34 X |
| 5,059,494 A | 10/1991 | Vartainian et al. ............. 429/17 |
| 5,133,406 A | 7/1992 | Puri ............................ 166/266 |
| 5,202,194 A | 4/1993 | VanBerg, Jr. ................. 429/13 |
| 5,292,600 A | * 3/1994 | Kaufman ...................... 429/39 |
| 5,358,799 A | * 10/1994 | Gardner ................... 429/33 X |
| 5,506,066 A | * 4/1996 | Sprouse .................... 429/26 X |
| 5,540,208 A | 7/1996 | Kikutani ...................... 123/518 |
| 5,635,039 A | * 6/1997 | Cisar et al. ............... 429/30 X |
| 5,780,980 A | 7/1998 | Naito .......................... 318/139 |
| 5,935,725 A | * 8/1999 | Dhar et al. ............... 429/32 X |
| 5,976,725 A | 11/1999 | Gamo et al. .................. 429/25 |
| 6,082,452 A | 7/2000 | Shaw et al. ............... 166/105.5 |

FOREIGN PATENT DOCUMENTS

| | | | |
|---|---|---|---|
| WO | WO 98/40603 | 9/1998 | .......... E21B/41/00 |
| WO | WO 01/91206 | 11/2001 | |

OTHER PUBLICATIONS

"Fuel Cell Descriptions," http://www.dodfuelcell.com, Mar. 31, 2000.
"Fuel Cell Glossy," from the U.S. Fuel Cell Council, Aug. 19, 1999.

\* cited by examiner

Primary Examiner—Stephen Kalafut
(74) Attorney, Agent, or Firm—Williams, Morgan & Amerson; Tim Curington; Brigitte C. Jeffery

(57) ABSTRACT

One embodiment of the present invention is a fuel cell suitable for use downhole in an oil and gas well includes a fuel vessel that providing a source of fuel and an oxidant vessel providing a source of oxidant. A reaction zone comprises at least one cathode, at least one anode, and an electrolyte between each anode and cathode. A closed water vessel is connected to the reaction zone by at least one capillary flow path. The fuel cell also comprises a fuel conduit that connects the fuel vessel and the reaction zone. This fuel conduit comprises a fuel pressure control apparatus adapted to maintain a static pressure of fuel in the reaction zone. The fuel cell further comprises an oxidant conduit that connects the oxidant vessel and the reaction zone, and includes an oxidant pressure control apparatus adapted to maintain a static pressure of oxidant in the reaction zone. In addition, the fuel cell comprises electrical conductors connected to the anode and cathode and adapted to conduct electricity to an external device. In this fuel cell, there is no need for fuel, oxidant, or water to flow in a closed loop through the reaction zone.

48 Claims, 10 Drawing Sheets

FUEL CELL FOR DOWNHOLE POWER SYSTEMS

The present application claims priority from provisional application No. 60/204,676 filed on May 17, 2000.

TECHNICAL FIELD OF THE INVENTION

This invention relates to fuel cells, and in one embodiment, to fuel cells that are especially well suited for downhole use in oil and gas wells, and for subsea use in connection with offshore wells. The invention can also be useful for commercial energy generation, powering electric vehicles, and powering other equipment, for example, communication and control equipment located in remote areas away from commercially available power sources.

BACKGROUND OF THE INVENTION

Several types of equipment used downhole in oil and gas wells, or beneath the surface of the sea adjacent to offshore wells, are electrically operated or actuated. Examples of such equipment include certain wireline tools and remote well telemetry equipment. The electrical power required can be provided by connecting the device to a surface power source via electrical cables, or by placing a power source near the site of the device itself. Often it is not practical to use electrical cables running from the surface to the subterranean or subsea site of the electrically-powered device, because of the great distance involved, or because the cables can interfere with the passage of other equipment through the wellbore, and are vulnerable to being damaged during well operations.

Batteries can be used as a local source of power for downhole and subsea electrical devices, but are subject to their own problems. For example, increasing the power and energy generation capacity of a battery generally requires a proportionate increase in the size of the battery, which can present difficulties given the space constraints that exist in wellbores. Also, batteries will typically need to be electrically recharged at some point, thereby often making it necessary to provide some type of recharging equipment in physical proximity to the battery.

Fuel cells make use of an electrochemical reaction involving a fuel and an oxidant in a cell that comprises an anode, cathode, and electrolyte, to generate electricity without also generating the unwanted by-products associated with combustion, while providing relatively higher energy efficiency. Thus, fuel cells potentially have a number of advantages over other power generation or storage means in many applications. The fuel cells of the present invention can be used in a variety of applications. Although the invention is primarily described herein in relation to applications involving subterranean wellbores, it should be understood that the invention can be used in applications other than wellbore applications.

A number of obstacles have hindered the use of fuel cells in downhole and subsea applications. For instance, fuel cells typically include one or more pumps to provide circulation of fuel and/or oxidant in a closed loop through the cell. If such a pump fails downhole, repair or replacement can be extremely expensive, given the need to retrieve the fuel cell to the surface. Further, the operation of the pumps consumes some of the energy produced by the cell, thus reducing the net power yield available to operate an external device. This latter point can be a significant problem in downhole or subsea applications in which a supply of power is needed for an extended period of time, and yet space constraints limit the ability to simply increase the size of the fuel and oxidant reservoirs. Additionally, the reaction product, water vapor, needs to be removed from the fuel cell stack in order to continuously run the fuel cell. Removal of the water downhole and in a subsea environment presents a challenge because the surrounding pressure is higher than that present in a conventional fuel cell placed at surface in an ambient environment and operating in air. Using a pump to expel the water into the high pressure downhole or subsea environment may require a large amount of power making such a system impractical.

VanBerg U.S. Pat. No. 5,202,194 describes a power supply for providing electricity to electrical circuits located downhole in a well. The power supply comprises a fuel cell, which is fed by hydrogen from a pressure container and oxygen from compressed oxygen gas bottles. Pressure regulators are located in the line between the hydrogen container and the fuel cell, and in the line between the oxygen bottles and the fuel cell. A pump is used to eject water from the fuel cell into the wellbore. The need to have a water outflow path from the interior of this fuel cell to its exterior raises potential reliability issues and may be impractical for downhole use.

There is a need for a new fuel cell operation concept and an improved fuel cell apparatus that can provide the electrical power needed to operate various downhole and subsea equipment.

SUMMARY OF THE INVENTION

One embodiment of the present invention relates to a fuel cell that includes a fuel vessel that comprises a source of fuel and an oxidant vessel comprising a source of oxidant. A reaction zone comprises at least one cathode, at least one anode, and electrolyte between each anode and cathode. A closed water vessel is connected to the reaction zone by at least one capillary flow path. The fuel cell also comprises a fuel conduit that connects the fuel vessel and the reaction zone. This fuel conduit comprises a fuel pressure control apparatus adapted to maintain a static pressure of fuel in the reaction zone. The fuel cell further comprises an oxidant conduit that connects the oxidant vessel and the reaction zone, and includes an oxidant pressure control apparatus adapted to maintain a static pressure of oxidant in the reaction zone. In addition, the fuel cell comprises electrical conductors connected to the anode and cathode and adapted to conduct electricity to an external device.

In a fuel cell of certain embodiments of the present invention, there is no need for fuel, oxidant, or water to dynamically flow in a closed loop through the reaction zone. This is because the fuel and oxidant vessels, and the pressure control apparatus, provide a static, elevated pressure in the reaction zone. The closed water vessel receives and stores the water (liquid) produced by the fuel cell reaction, thus eliminating the need to pump the water out of the fuel cell for disposal.

In some embodiments, the fuel cell of the present invention does not include any fuel pump, oxidant pump, or water pump. As mentioned above, such pumps are not required in some embodiments of the present invention. It is also possible that the reaction zone comprise as its only openings for fluid flow at least one aperture connected to the fuel conduit for admitting fuel into the reaction zone, at least one aperture connected to the oxidant conduit for admitting oxidant into the reaction zone, and the capillary flow path (or paths) that connects the reaction zone to the water vessel. The capillary flow path can comprise a tube, thread, conduit or other forms that can transport the produced water from the reaction zone to the water vessel and can be attached to or lying on or otherwise physically touching the membrane surfaces of the reaction zone.

The fuel cell of some embodiments of the present invention is operated with a static pressure in the reaction zone that is high enough to cause any water vapor formed and generated in the fuel cell to condense once the saturation point is reached. Accordingly, the fuel cell must operate at a pressure that is higher than the saturated water vapor pressure for the given application. A "static pressure" in this context is one that varies between the anode and cathode chamber of the fuel cell not more than about 5% in normal operation. Some embodiments of the invention operate with pressures for the reaction zone between about 40–400 psig, more typically about 50–200 psig, depending upon the operating temperature.

In one specific embodiment of the invention, the fuel pressure control apparatus and the oxidant pressure control apparatus are pressure regulator valves. In another specific embodiment of the invention, the water vessel is located within at least one cathode. In other embodiments the water vessel is located external to the reaction zone.

Although the fuel cell of the present invention can operate with a single anode, cathode, and electrolyte, in many applications it will be desirable to have multiple cells in a single apparatus. Therefore, an alternate embodiment comprises at least one additional fuel cell that includes an anode, cathode, and electrolyte, with the fuel cells being arranged in a stack configuration. In this embodiment of the invention, at least one bipolar plate that comprises the anode of one fuel cell in the stack and the cathode of an adjacent fuel cell in the stack can be included. For example, the bipolar plate can comprise two substantially planar surfaces, the anode being located on one of the surfaces and the cathode being located on the other surface. "Substantially planar" in this context means that the overall surface of the plate is generally planar, although there may be grooves in the surface to facilitate distribution of fuel or oxidant.

The present invention can be used with a variety of types of fuel cells, including phosphoric acid fuel cells and alkaline fuel cells.

The present invention is especially well adapted for use with proton exchange membrane fuel cells. Embodiments of the invention can operate at an elevated temperature and pressure. The temperature can operate, for example, within the range of 80° C. to 130° C. The higher operating pressure (up to 400 psi) keeps the membrane from dehydrating at the elevated operating temperature (more than about 80° C.). The pressure regulators on the fuel and oxidant supplies control the operating pressure. The temperature and pressure controls allow a balance to be met that allows the membrane to stay hydrated while also enabling the condensation of the water vapor and the liquid water removal from the reaction zone. The closed end nature of the fuel cell, wherein the fuel and oxidant supply each have an inlet to the reaction zone but there is no gas outlet from the reaction zone, allows the operation at elevated pressures. The only outlet from the reaction zone is the outlet to remove produced water. If produced water is not removed from the reaction zone the water will build up and the fuel cell would not be able to continue the reaction. If the membrane were to become dehydrated, the fuel cell would fail because the membrane must be wet to operate. In a particular embodiment of the proton exchange membrane fuel cell, the electrolyte between the anode and cathode comprises a polymer material.

The present invention is also well adapted for use with solid oxide fuel cells. The higher operating temperatures, such as 700 degrees C., of a solid oxide fuel cell enables the use of this type cell in even the most extreme high temperature well applications. In a solid oxide fuel cell, water is produced on the anode side, so the water vessel is in communication with the anode. The water vessel can comprise a metal hydride material that is capable of reacting with the water byproduct of the fuel cell and releasing hydrogen gas. This produced hydrogen gas can be utilized as fuel and can be transported from the water vessel to the fuel conduit by means of a fuel recycle conduit. A fuel regeneration vessel can be connected to the anode portion of the reaction zone by one or more flow paths that can enable it to receive produced water. The metal hydride material contained in the fuel regeneration vessel can react with the water and produce hydrogen gas. A regenerated fuel conduit connecting the fuel regeneration vessel to the fuel conduit transports the hydrogen gas. An internal pump can be included with the regeneration vessel or the regenerated fuel conduit to enable the gas to combine with the fresh fuel. In a solid oxide fuel cell the electrolyte will typically comprise a solid ceramic material.

A further embodiment of the present invention comprises a housing and at least one membrane within the housing, the membrane having opposing surfaces. A supply of oxygen is in communication with one surface of the membrane while a supply of hydrogen is in communication with the other surface of the membrane. The membrane comprises at least one slanted surface. The membrane can have a shape, for example, such as frustoconical, conical, hemispherical, bowl-shaped, or curved. As with some of the other embodiments, it is possible for this fuel cell to comprise no internal moving parts and can be connected to a battery to form a hybrid power supply.

Yet another embodiment is a fuel cell as described above which also comprises at least one separator/electrode plate adjacent to the membrane. The separator/electrode plate is constructed so as to define at least one groove, the groove having a coating of a hydrophobic material such as wax or grease. The hydrophobic material facilitates the removal of produced water from the reaction zone.

Another embodiment comprises at least one reservoir that is in fluid communication with an area proximal to at least one of the surfaces on the membrane. The reservoir may be positioned below the membrane, so gravitational forces can assist in the water removal. The reservoir can be positioned to receive produced water in the form of steam or liquid and can further comprise a screen intermediate in the inlet and the outlet, a desiccant within the reservoir, and a water chamber. The fuel cell can also comprise a pump communicating with a reservoir outlet and can comprise an internal circulation pump communicating with the fresh oxidant inlet.

The fuel vessel and oxidant vessel can take different forms in the present invention. For example, the fuel vessel can comprise a pressure vessel that holds pressurized hydrogen gas or reformed hydrocarbon gas. However, alternate embodiments of the invention can include a fuel vessel comprising at least one metal hydride capable of releasing hydrogen gas. The use of metal hydride as a storage means for hydrogen provides a very efficient use of space, which can be an important consideration in downhole and subsea applications. Also, the metal hydride hydrogen storage improves the safety of the fuel cell by allowing operation at lower pressures relative to the pressures required if pure hydrogen were used. It should be noted that, while the present invention is described with operating ranges, different types of metal hydride are available that operate at higher pressures, such as between 500 and 800 psi, for example. Using these higher pressure metal hydrides can increase the operating temperature of the fuel cell to 100° C. to 200° C. or higher. The oxidant vessel can comprise, for example, a pressure vessel that contains oxygen gas at a pressure of at least about 1,000 psig, or alternately at least about 5,000 psig, to about 15,000 psig.

Fuel cells of the present invention are very well suited for applications in which a low power output is needed for an extended time. For example, in one embodiment of the invention, the fuel cell has a power output of at least about 1 watt (e.g., 1–30 watts, often about 10–20 watts) for a period of several weeks. Larger fuel cell apparatus of the present invention can also be used in applications requiring higher power output. In some alternate embodiments in higher power applications the oxygen may be circulated, which can facilitate a higher power output.

In one embodiment of the invention, the fuel cell further comprises a housing that encloses at least part of the reaction zone and comprises a cylindrical outer wall. In other words, the housing encloses part or all of the reaction zone, and optionally can also enclose the fuel and oxidant vessels. The housing may also comprise a cylindrical inner wall that defines an open longitudinal bore in the fuel cell. In this embodiment of the invention, the annular configuration of the fuel cell makes it well suited for use downhole in oil and gas wells by defining at least one passageway through the fuel cell. Passageways within the fuel cell can be useful through which to produce formation fluids or to run cables, conduits or other devices. The housing may alternatively comprise a portion of an annulus or some other shape that facilitates placement in an annular space. Circular or cylindrical devices are also particularly useful for downhole applications. The housing can enclose the produced water vessel in addition to the fuel and oxidant vessels and the reaction zone. In one embodiment of the invention, the housing encloses the entire fuel cell, except for the electrical conductors that are adapted to conduct electricity to an external device.

The purpose of placing the fuel cell downhole in a well, or in a subsea location in or adjacent to an offshore well, is to supply power to an electrical device. Therefore, in such applications, the apparatus may also comprise a downhole electrical device, or a subsea electrical device, which is electrically connected to the fuel cell (e.g., by wires or electrical cables). In some embodiments of the invention the fuel cell is connected to a battery to form a hybrid power source. The battery can be of a rechargeable type that can be charged from the fuel cell during less than peak power demand and can discharge in order to assist the fuel cell during peak power demand. The battery-fuel cell hybrid power source can thus supply a broader range of power loads than the fuel cell acting alone can supply.

One particular embodiment of the present invention is a power supply system that comprises a fuel cell and a rechargeable battery that is electrically connected to the fuel cell such that the fuel cell recharges the rechargeable battery during periods of non-use.

Another aspect of the present invention is a downhole assembly that comprises a downhole structure (e.g., a drillstring, well casing, or well tubing) located in a subterranean borehole. A fuel cell, as described above, is attached to the downhole structure and a downhole electrical device is electrically connected to the fuel cell. Yet another aspect of the present invention is a subsea assembly that comprises a subsea structure (e.g., a riser pipe), for an offshore well and a fuel cell (as described above) attached to the subsea structure. A subsea electrical device (e.g., an umbilical-less control system) is electrically connected to the fuel cell.

The present invention provides a simple, reliable, and efficient means of generating electrical power in a downhole or subsea environment. The fuel cell apparatus of the present invention can provide power without the need for any moving parts, thereby decreasing the chance of a mechanical failure.

The fuel cell apparatus of the present invention is also useful for remote power applications, such as providing power for geosensors located at the surface of the earth in locations spaced far enough apart that installing and replacing conventional batteries would be burdensome and expensive.

The present invention also has safety benefits. The embodiments of the present invention that use metal hydride as a means for storing hydrogen largely eliminate the safety risks involved with storing hydrogen gas under high pressure.

The closed nature of the fuel cell apparatus of certain embodiments of the present invention provides improved reliability compared to prior fuel cells. Since no fluid of any kind needs to be pumped from the inside of the fuel cell apparatus to an external location, there are no apertures to the outside world that could become a source of leaks, and there is no need for a pump that would consume part of the power generated by the fuel cell and could potentially break down.

The static elevated pressure operation of the present invention keeps the membrane in a proton exchange membrane fuel cell hydrated, and thus allows operation at a wide range of temperatures (e.g., 0–150° C.).

The power generation capacity of fuel cells can be increased simply by using a higher capacity fuel vessel and/or a larger capacity oxidant vessel. Thus, unlike batteries, an increase in the power and energy generation capacity of a fuel cell does not require a proportional increase in its size.

One embodiment of the present invention is a method for supplying power to a well comprising providing a fuel cell within or near the well. The method can comprise electrically connecting the fuel cell to a downhole electrical device and connecting a battery to the fuel cell to form a hybrid power source. The method can also comprise connecting the fuel cell to a tubular string and inserting the fuel cell and tubular string into the wellbore.

Yet another embodiment is a method for completing a wellbore by providing a fuel cell comprising a fuel vessel for a source of fuel and an oxidant vessel for a source of oxidant. The fuel cell has a reaction zone having at least one cathode, at least one anode, and electrolyte between each anode and cathode. A closed water vessel is connected to the reaction zone by at least one capillary flow path. A fuel conduit connects the fuel vessel and the reaction zone, and comprises a fuel pressure control apparatus adapted to maintain a static pressure of fuel in the reaction zone. An oxidant conduit connects the oxidant vessel and the reaction zone and comprises an oxidant pressure control apparatus adapted to maintain a static pressure of oxidant in the reaction zone. Electrical conductors are connected to the anode and cathode and adapted to conduct electricity to an external device. The fuel cell is connected to an electrical device and the fuel cell and electrical device are inserted into the wellbore. The fuel cell can be connected to a battery, thus forming a hybrid power source. The fuel cell can be constructed to define at least one passageway through the fuel cell. Formation fluids may then be produced from the wellbore, the formation fluids flowing through the passageway defined by the fuel cell.

Still another embodiment is a method of supplying power to an electrical circuit of a downhole tool that comprises providing a fuel cell comprising a housing, a fuel vessel, an oxidant vessel and electrical connectors, where the fuel cell is enclosed within the housing except for the electrical connectors. The fuel cell is electrically connected to the electrical circuit of the downhole tool and the downhole tool and fuel cell are inserted into a wellbore. Electricity is generated within the wellbore from the fuel cell and supplies at least some of the electricity needed to energize the electrical circuit of the downhole tool. A battery may be electrically connected to the fuel cell, thus forming a hybrid power supply capable of storing a portion of the electricity generated by the fuel cell. The fuel cell can further comprise a pump and an outlet, the pump being capable of discharging produced water from the outlet of the fuel cell. An alternate embodiment of this method utilizes a fuel cell that comprises no internal moving parts. Water produced within the fuel cell can be contacted with metal hydride material to produce hydrogen gas, which can be injected into a fuel supply line to the fuel cell reaction zone.

Another alternate embodiment is a fuel cell comprising a proton exchange membrane, a closed end chamber on an oxygen side of the membrane and a closed end chamber on a hydrogen side of the membrane. A water vessel may be connected to at least one of the closed end chambers by at least one capillary flow path in which to store the water byproduct produced. The fuel cell can further comprise a proton exchange membrane, a pressurized oxygen supply communicating with a first side of the membrane, and a pressurized hydrogen supply communicating with a second side of the membrane. The pressurized supply of oxygen and hydrogen are capable of maintained the first and second membranes within a pressure range of about 30 to 300 psi.

A method for use with a fuel cell comprises providing a proton exchange membrane fuel cell and operating the fuel cell at a temperature equal to or greater than 90° C. In some embodiments the operating temperature can be equal to or greater than 100° C., or alternately equal to or greater than 120° C.

Another embodiment of the invention is a method for use with a fuel cell comprising providing a proton exchange membrane fuel cell that generates water vapor during operation, and condensing a portion of the water vapor within the fuel cell. The condensing of the water can occur within the reaction zone and some of the liquid water can be removed from the reaction zone by a capillary flow path to a water vessel.

Certain embodiments of the present invention can be applied as a power source for use in a well, comprising a proton exchange membrane-type fuel cell, and as a method for powering a tool in a well, comprising operatively connecting a proton exchange-type fuel cell to the tool.

Certain embodiments of the present invention can also be applied as a power source for use in a well, comprising a solid oxide-type fuel cell, and as a method for powering a tool in a well, comprising operatively connecting a solid oxide-type fuel cell to the tool.

An alternate embodiment of the invention is as a method for providing power in a high temperature well, comprising providing a fuel cell capable of operating temperatures at or above 600° C. This fuel cell can operate in environments with temperatures from 0° C. to 1,000° C.

Still another embodiment is a fuel cell comprising at least one capillary member, which can have at least one membrane/electrode assembly and at least one water vessel. The at least one capillary member is capable of transporting water from the membrane/electrode assembly to the water vessel. One end of the at least one capillary member is located on the surface of the membrane/electrode assembly, extending away from the surface of the membrane/electrode assembly while the other end of the capillary member is in contact with the water vessel. The at least one capillary member is capable of communicating water from the membrane/electrode surface to the water vessel. More than one capillary member can communicate water from the membrane/electrode surface to a common water vessel.

DETAILED DESCRIPTION OF EMBODIMENTS

Embodiments of the present invention provide a practical means of using fuel cells in downhole or subsea locations to power electrical devices that are used far below the surface of the well or the surface of the water. However, it should be understood that the fuel cells of the present invention can be used in other contexts as well, and the invention is not limited to subsea and downhole uses in or around oil or gas wells. In some applications, a fuel cell can supply more reliable and a greater cumulative quantity of power than alternative forms of energy, such as batteries. The greater energy and power density of a fuel cell over other alternatives can often decrease the weight and size of the overall power unit. The decrease in size of the fuel cell power unit can enable the use of instruments and tools requiring electrical power in applications where they could not be utilized before. Fuel cells are considered an environmentally clean energy source since the primary waste product generated from fuel cell usage is water (assuming a fuel source of hydrogen).

Figure 1:
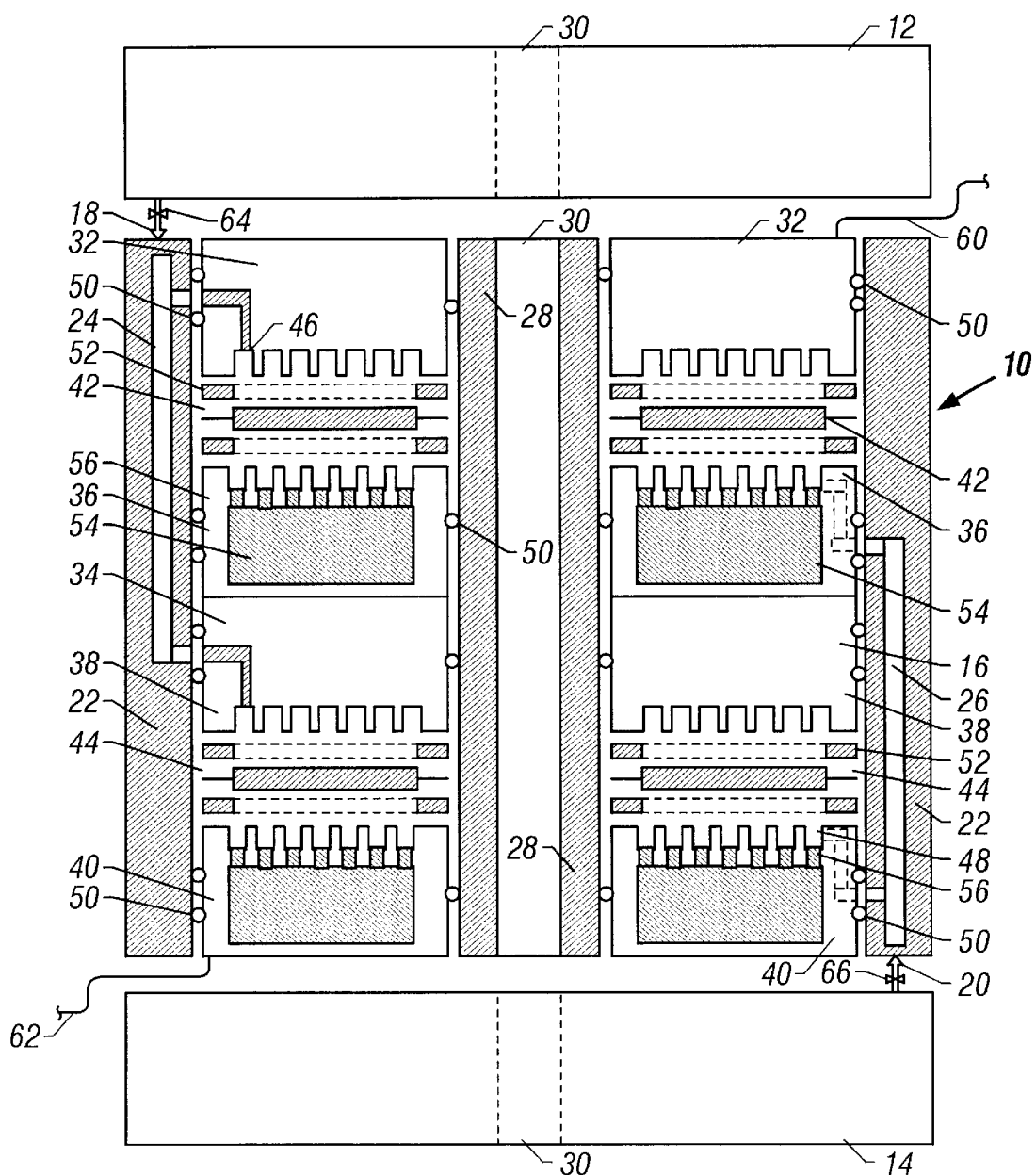
FIG. 1 is a cross-sectional drawing of a fuel cell apparatus of an embodiment of the present invention, comprising two fuel cells in a stack configuration.

FIG. 1 shows one embodiment of the present invention in cross-section. A fuel cell 10 comprises a fuel vessel 12, an oxidant vessel 14, and a reaction zone 16. It should be noted that although a single fuel vessel and oxidant vessel are mentioned throughout this application multiple fuel and oxidant vessels can be adapted for use by one skilled in the art.

The fuel vessel 12 comprises a source of a fuel suitable for use in the fuel cell, such as hydrogen gas or a reformed hydrocarbon. In one embodiment, the fuel vessel comprises a metal hydride. This provides a high-density means for storing hydrogen. Hydrogen gas is released from the solid hydride, and flows through a fuel conduit 18 to the reaction zone 16. Alternatively, the vessel could comprise hydrogen gas under high pressure (e.g., 500 to 5000 psig). Utilizing a metal hydride for hydrogen storage has a number of advantages over a conventional high-pressure gas storage system. The metal hydride can provide more storage capability on a per unit volume basis and the lower pressure metal hydride can provide a safer mode of operation, especially in a high temperature environment. The fuel supply to the reaction zone 16 is controlled by a valve 64 that is typically a pressure control valve.

Similarly, the oxidant vessel 14 contains an oxidant, such as air or oxygen gas under high pressure (e.g., 5,000 to 15,000 psig), which flows through an oxidant conduit 20 to the reaction zone. The oxidant supply to the reaction zone 16 is controlled by a valve 66 that is typically a pressure control valve. The valves 64, 66 control the pressure within the reaction zone 16. Since there are fuel and oxidant inlets but no gas outlets from the reaction zone 16, embodiments such as this can be referred to as a closed end reaction zone or a fuel cell having a closed end chamber on the fuel side and the oxidant side. The term closed end chamber is meant to refer to a chamber having a gas inlet, no gas outlet, and optionally having a water outlet.

The fuel cell in this embodiment comprises an outer wall 22 that has a circular cross-section in a horizontal plane. Within this wall are passageways 24 and 26 for fuel and oxidant, respectively. These passageways act as extensions of the fuel conduit 18 and the oxidant conduit 20, and serve to carry fuel and oxidant to the desired sites in or adjacent to the electrodes of the fuel cell.

Figure 10:
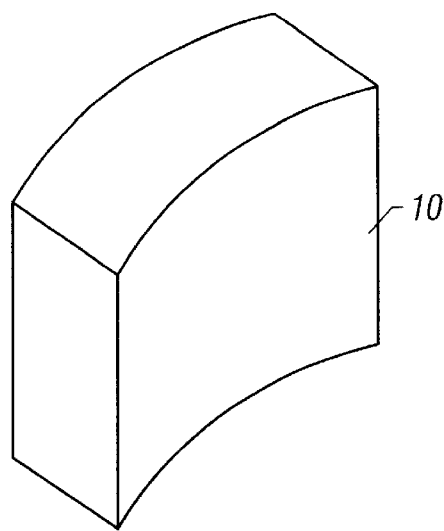
FIG. 10 is an alternative fuel cell shape.

The fuel cell also comprises an inner wall 28, which also has a circular cross-section in a horizontal plane. This inner wall 28 defines an open longitudinal bore 30 through the center of the reaction zone. The fuel vessel 12 and oxidant vessel 14 may also comprise such an open longitudinal bore 30 along their longitudinal axis. Note, however, that the fuel cell may be circular or have any other shape desired. FIG. 10 shows an alternative housing shape which is a portion of an annulus, or arcuate. The housing may have some other shape that facilitates placement of the fuel cell in an annulus.

Within the annular space defined by the outer wall 22 and the inner wall 28 lies the reaction zone 16 of the fuel cell. This reaction zone, in the embodiment of FIG. 1, comprises an anode plate 32, a bipolar plate 34 that comprises a cathode plate portion 36 on one of its sides and an anode plate portion 38 on its other side, and a cathode plate 40. Between each anode and cathode lies electrolyte. The embodiment of FIG. 1 employs proton exchange membranes 42 and 44 as electrolyte. These components may be stacked in various combinations to provide fuel cells with more or fewer reaction zones and membranes.

The fuel conduit 18 can pass through the outer wall 22 and into each anode plate 32 and 38, where it can empty into grooves 46 in the anodes. This allows feeding of fuel to the surface of the anode plates. Similarly, the oxidant conduit 20 can pass through the outer wall 22 and into each cathode plate 36 and 40, where it can empty into grooves 48 in the cathodes.

The reaction zone of the fuel cell may also comprise a plurality of seal members 50, such as O-rings, to seal the electrodes against the outer wall 22 and inner wall 28. In an alternate embodiment the reaction zone may comprise seals, such as fluorocarbon polymer (e.g., Teflon) seal members 52 (e.g., gaskets) between the electrodes and the proton exchange membrane.

The fuel cell also comprises a receptacle for water, optionally located within the fuel cell, so that water need not be pumped or otherwise expelled from the fuel cell housing. In particular, water vessels 54 are located within the cathode plates 36 and 40, and are connected to the surface of each cathode by capillary tubes 56. These tubes 56 allow water formed by the fuel cell reaction to be drawn into the vessels 54, thereby eliminating the need to pump the water to an external disposal site. The elimination of the need to pump the produced water to an external site enables a higher net energy output, since there is no pump required that would consume some of the energy generated. The resulting system is also a simpler system, since there are no required moving parts for water disposal. The water formed by the fuel cell reaction can be drawn into the vessels by capillary action, gravity, or a combination of the two. The capillary effect removes water from the reaction zone without regard to the orientation of the fuel cell stack. This fact can be particularly useful for applications within wellbores that are deviated from vertical, such as in horizontal laterals.

The totally enclosed design results in highly efficient fuel and oxidant usage, since the reactants, typically $H_2$ and $O_2$, remain within the fuel cell stack until they are consumed in the reaction and only the reaction product ($H_2O$) is removed from the reaction zone.

Figure 12:
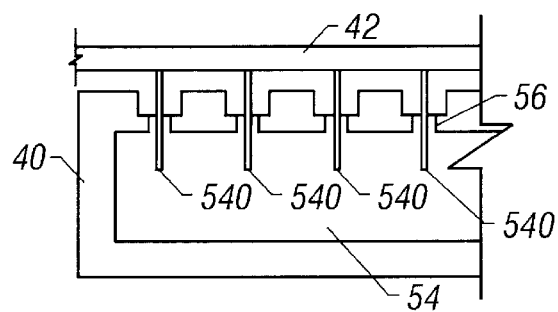
FIG. 12 a side elevational, cross sectional view showing the capillary members leading into a reservoir.

FIG. 12 schematically shows how the capillary member 540, which may be a tube or thread or other similar device, extends from a position proximal the surface of the membrane or touching the membrane to the reservoir. Although the water receptacle vessels 54 are shown located in the cathode plates in FIG. 1, it should be understood that they could be located elsewhere in the apparatus as well. The water vessels 54 may comprise a material that will absorb water. A water absorbing material can act to draw the water from the capillary member and thus enhance the removal of the produced water from the reaction zone. A water absorbing material can also act to bind the water and restrict the water from possibly migrating out of the water receptacle vessel 54 in some manner.

In the embodiment shown in FIG. 1, the outer wall 22 of the fuel cell encloses the electrodes and electrolyte, but not the fuel and oxidant storage vessels 12 and 14. It would also be possible to have the outer wall enclose the fuel and oxidant storage vessels 12, 14 as well. This design would make the entire apparatus totally enclosed within a single housing and having only the electrical conductors 60 and 62 extending beyond the housing, these being used for conducting the electrical power generated by the fuel cell to an external device. Examples of external devices that can be powered by fuel cells include wireline tools, measurement while drilling (MWD) instruments, downhole remote telemetry equipment, downhole sensors, intelligent control and monitoring units, and the like.

In operation, a fuel pressure regulator valve 64 located in the fuel conduit 18, and an oxidant pressure regulator valve 66 located in the oxidant conduit 20, control the pressure of fuel and oxidant in the reaction zone 16. These valves 64 and 66 are adjusted such that a relatively high pressure, ranging from about 40–400 psig, most typically about 50–200 psig, is maintained in the reaction zone. The pressure in the reaction zone is static during operation (e.g., the pressure varies no more than about 5%, and may stay unchanged). The temperature may range from about 0–150° C., more typically from about 0–120° C. Operating the fuel cell at a relatively high pressure assists in the condensing of the byproduct water, typically produced in the form of steam, into a liquid phase that can be removed from the reaction zone as discussed above. The condensing and removal of the produced water maintains a constant partial pressure of the fuel and oxidant which enables the reaction to continue.

Although the present invention can make use of different types of fuel cells, such as phosphoric acid fuel cells and alkaline fuel cells, it is also possible to use proton exchange membrane fuel cells. The anodes and cathodes in such proton exchange membrane fuel cells can be made by applying a small amount of platinum black to one surface of a thin sheet of porous, graphitized paper. The membrane is often sandwiched between the anode and cathode and the three components sealed together under heat and pressure to produce a single "membrane/electrode assembly." The proton exchange membrane may be made from a polymer such as NAFION (available from Dupont). The anode and cathode are typically contacted on the back side by flow field plates made of graphite in which channels have been formed. The channels supply fuel to the anode and oxidant to the cathode. Hydrogen from the fuel gas stream is consumed at the anode, yielding electrons to the anode and producing hydrogen ions, which enter the membrane. At the cathode, oxygen combines with electrons from the cathode and hydrogen ions from the membrane to produce water.

The present invention is especially well adapted for use with proton exchange membrane fuel cells. Embodiments of the invention can operate at an elevated temperature and pressure environment within the reaction zone. The temperature can operate, for example, within the range of 80° C. to 130° C. The pressure can range from atmospheric up to in excess of 400 psi, but will typically range from about 50–100 psi. The higher operating pressure keeps the membrane from dehydrating at the high operating temperature by keeping the pressure above the phase equilibrium curve. In this manner the pressure will be somewhat higher than needed for a saturated water vapor phase, thus maintaining a water vapor phase to keep the membrane hydrated while the excess pressure, supplied by the fresh oxidant, assists in condensing liquid water that can be removed from the reaction zone while also providing oxygen for the reaction to proceed. For example, at a temperature of 100° C. and atmospheric pressure (approximately 15 psi), the boiling point of water, there would be saturated steam and no driving force for the fuel cell reaction, thus the fuel cell in these conditions would fail to generate power in a closed system fuel cell. However at 100° C. and an elevated pressure, say 25 psi, in a closed system having a liquid water containment vessel, there would be sufficient water vapor to keep the membrane hydrated, and the excess 10 psi of pressure from the supplied oxygen would assist in condensing a portion of the produced water vapor that could be removed from the reaction zone, in addition to supplying a driving force and source of oxidant for the fuel cell reaction to take place.

The pressure regulators on the fuel and oxidant supplies control the operating pressure on their respective sides of the membrane. The temperature and pressure controls allow a balance to be met that allows the membrane to stay hydrated while also enabling the condensation of the water vapor and the liquid water removal from the reaction zone. The closed end nature of the fuel cell, where the fuel and oxidant supply each have an inlet to the reaction zone but there is no gas outlet from the reaction zone, allows the operation at elevated pressures. The only outlet from the reaction zone is the outlet to remove produced water to the water containment vessel. If produced water is not removed from the reaction zone, the water will build up and the fuel cell would not be able to work. If the membrane were to become dehydrated, the fuel cell would fail because the membrane must be wet to operate. In a particular embodiment of the proton exchange membrane fuel cell, the electrolyte between the anode and cathode comprises a polymer material.

Figure 15:
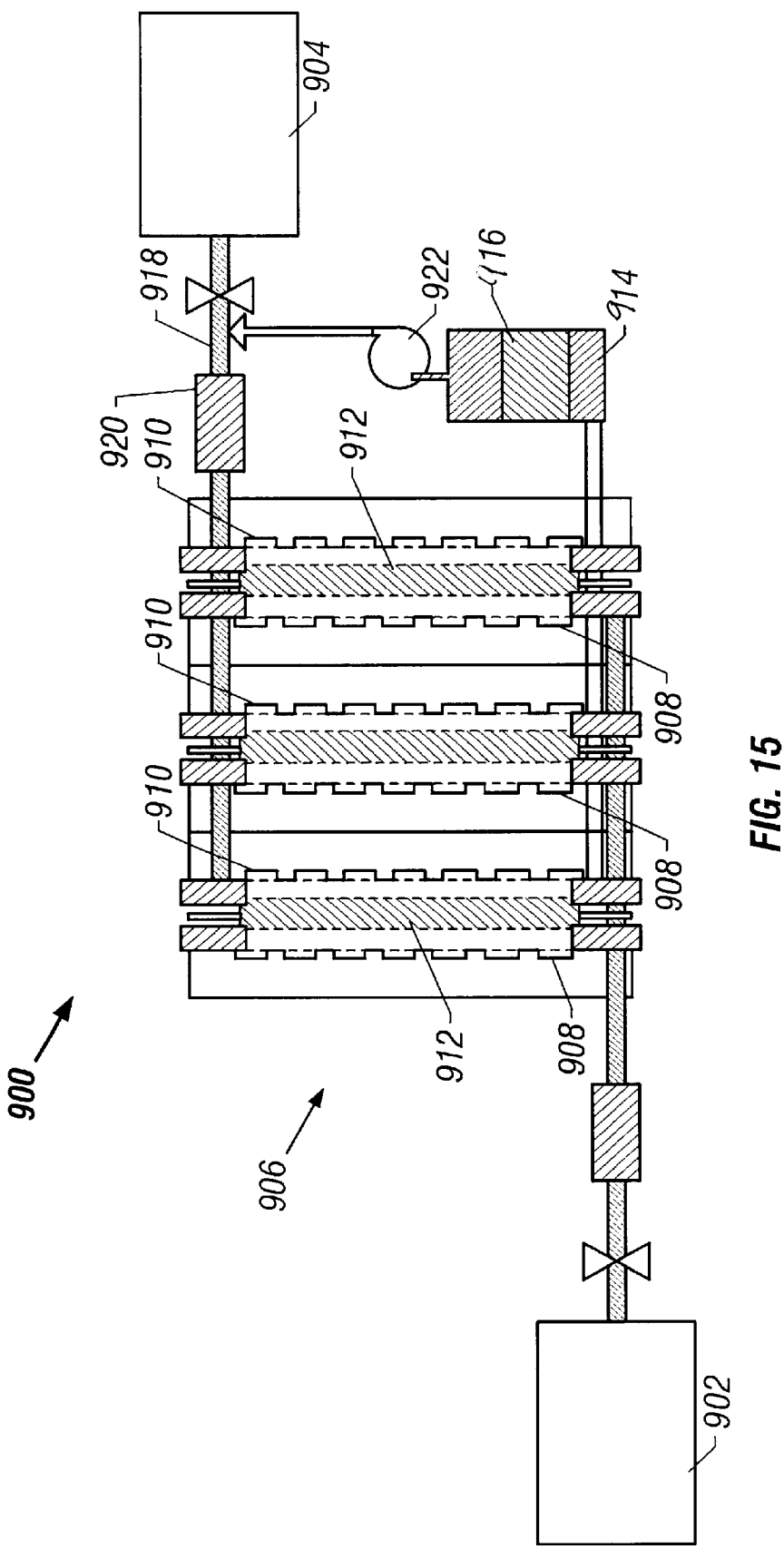
FIG. 15 is an illustration of an embodiment of a proton exchange membrane fuel cell.

FIG. 15 is an illustration of an embodiment of a proton exchange membrane fuel cell. In the proton exchange membrane fuel cell, shown generally as 900, a fuel vessel 902 and an oxidant vessel 904 are in communication with a reaction zone 906. The reaction zone 906 shown comprises three anodes 908 and three cathodes 910 separated by the proton exchange membrane 912. Water is produced is on the cathode 910 side, so the water vessel 914 can be in communication with the cathode/oxygen 910 section of the cell. Shown is a common water vessel 914 that can receive produced water from all three cathode 910 sides of the membrane 912. Water scrubber materials 916 can be used within the water vessel 914 to facilitate the separation of the oxygen from the produced water of the proton exchange membrane fuel cell 900. The oxygen gas that is separated from the produced water can then be added to the oxidant stream 918 supplying the fuel cell reaction zone 906. The recycled oxygen gas is shown being added to the oxidant stream 918 upstream of a check valve/regulator 920 that prevents backflow from the reaction zone 906. A pump 922 may be required to achieve the recycled oxygen gas flow into the oxidant stream 918. The recycled oxygen can also be added to the oxidant stream 918 downstream of the check valve/regulator 920 such that it operates to induce an internal circulation means for the oxygen side of the membrane 912. In some embodiments of the proton exchange membrane fuel cell a greater power output can be obtained by having an internal circulation means for the oxygen.

In proton exchange membrane fuel cells that run on fuel other than pure hydrogen gas, a problem exists with carbon monoxide, CO, build up within the fuel side of the membrane. The CO can be absorbed onto the platinum powder that is within the electrode, and can result in effectively blocking the reaction. This problem is apparent in fuel cell applications such as, for example, in vehicles or commercial power generation that are fueled with hydrocarbon sources. The CO problem is especially noticed in fuel cells operating at atmospheric or near atmospheric pressures (pressures within about 10 psi of atmospheric) and at lower operating temperatures (less than about 100° C.). At elevated temperatures, such as for example, above 100° C., the rate of absorption of CO onto the platinum has been observed to be less. The present invention, due to the closed end operation, can operate at temperatures and pressures that are higher than those just mentioned. Therefore, embodiments of the present invention can operate with less of a tendency to be harmed by CO impurities in the fuel stream.

Certain embodiments of the invention can be used, for example, to power an electric vehicle having a hydrocarbon fuel source. Operating at elevated temperature and pressure as mentioned above, the fuel cell would have a reduced tendency for CO fouling. Being a closed end system, (having fuel and oxidant inlet, but only water outlet from the reaction zone), the CO that is present in the fuel will collect within the reaction zone. The CO that builds up within the reaction zone can be vented at periodic intervals in a controlled manner so as to maintain the desired pressure within the reaction zone. The produced water can be collected within a water containment vessel as described elsewhere in this application and the water can also be drained in a controlled manner to so as not to have water storage capacity become a restriction upon the longevity of the fuel cell life.

Yet another type of fuel cell that can be utilized with the present invention is a solid oxide fuel cell. The solid oxide fuel cell uses a ceramic, solid phase electrolyte that reduces corrosion considerations and eliminates the electrolyte management problems associated with the liquid electrolyte fuel cells. A ceramic material that can be used for this application is dense yttria-stabilized zirconia, which is an excellent conductor of negatively charged oxygen (oxide) ions at high temperatures. In order to achieve adequate ionic conductivity in such a ceramic, the system must operate at elevated temperatures, such as about 650 degrees C. or higher. The anode can be, for example, a porous nickel/zirconia cermet while the cathode can be, for example, a magnesium-doped lanthanum manganate. Numerous individual cells can be connected together by high temperature semiconductor contacts to increase the power output. The solid oxide fuel cell is not restricted by operating pressure within the fuel cell and can operate in, for example, operating pressure ranges from atmospheric to in excess of 400 psi. The ability to operate with a high operating pressure can be beneficial in designing the fuel cell for high temperature/high pressure applications.

In operation, hydrogen in the fuel stream reacts with oxide ions from the electrolyte to produce water and to deposit electrons into the anode. The electrons pass outside the fuel cell, through the load, and back into the cathode where oxygen from the oxidant source receives the electrons and is converted into oxide ions, which enter the electrolyte. The higher operating temperatures of a solid oxide fuel cell, for example 650° C.–1,000° C., enables the use of this type cell in even the most extreme high temperature well applications. Of course thermal insulation will be needed with a solid oxide fuel cell to protect the equipment and surrounding environment and to maintain the high temperature within the fuel cell required for its use.

Figure 13:
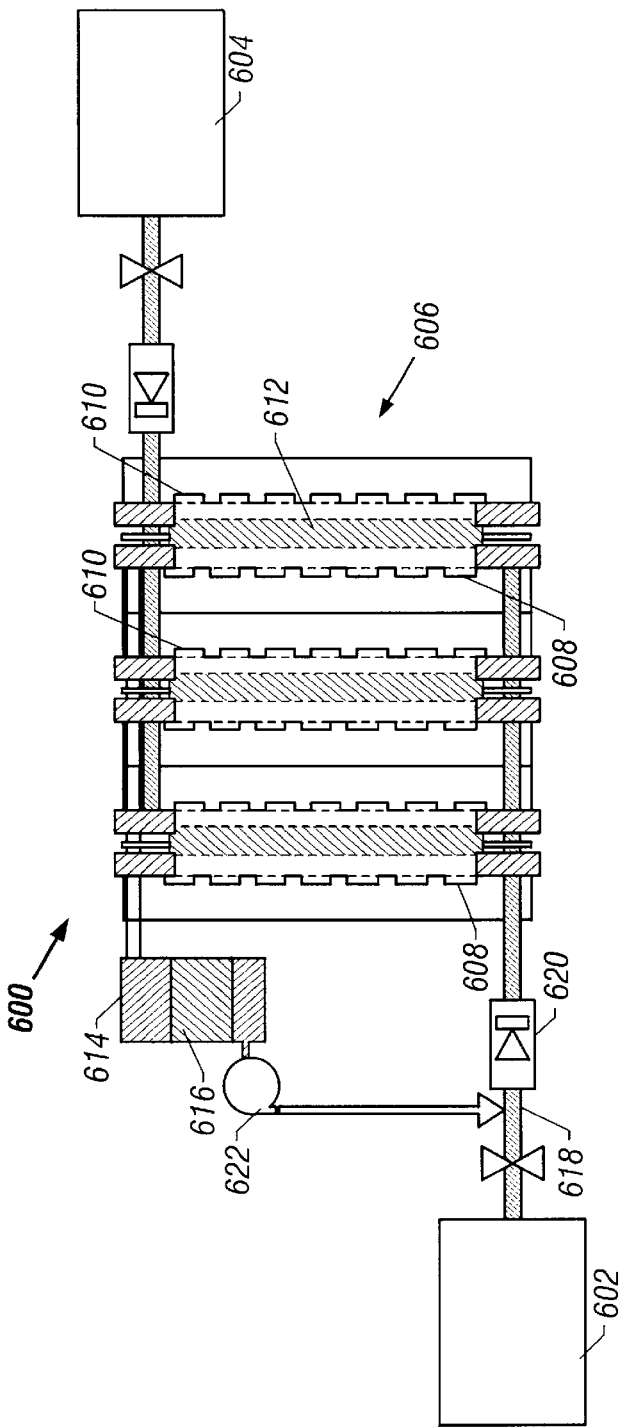
FIG. 13 is an illustration of an alternate embodiment of the invention comprising a three-cell fuel cell.

FIG. 13 is an illustration of an embodiment of a solid oxide fuel cell. In the solid oxide fuel cell, shown generally as 600, a fuel vessel 602 and an oxidant vessel 604 are in communication with a reaction zone 606. The reaction zone 606 shown comprises three anodes 608 and three cathodes 610 separated by the ceramic, solid phase electrolyte 612. Water is produced is on the anode 608 side, so the water vessel 614 can be in communication with the anode/hydrogen 608 section of the cell. Metal hydride 616 can also be used as a means of regenerating hydrogen from the produced water of the solid oxide fuel cell 600. Metal hydride material 616 contained within the receptacle of the produced water 614 can react with water and produce hydrogen gas, as shown in the simplified equation $MH+H_2O \rightarrow H_2+MOH$, where MH stands for metal hydride and MOH stands for metal hydroxide. The hydrogen gas that is released can then be added to the fuel stream 618 supplying the fuel cell reaction zone 606. The regenerated hydrogen gas is added to the fuel stream 618 upstream of a check valve 620 that prevents backflow from the reaction zone 606. A pump 622 may be required to achieve the regenerated hydrogen gas flow into the fuel stream 618.

The ability to regenerate a portion of the fuel from the produced water has beneficial results. The quantity of produced water that is required to be stored can be less and the quantity of original fuel that is required can be reduced. These results enable a smaller fuel cell apparatus to be used for a given quantity of energy produced or a set duration of fuel cell life at a known load. The solid oxide fuel cell can operate with internal temperatures ranging from about 650° C. to over 1,000° C. and with the proper insulation can operate within environments that includes the temperature range of 0° to 1,000° C. which would cover almost any wellbore environment. The ability of this embodiment to be used in such a broad range of temperature environments can be useful, as the temperature of the particular application would not be a detriment to using the solid oxide fuel cell.

Various embodiments of the present invention are able to operate in temperatures ranging from about 80 degrees C. (proton exchange membrane fuel cell) to in excess of 1000 degrees C. (solid oxide fuel cell). This ability to modify the invention to cover virtually all temperature ranges is useful when designing a particular application and considering factors such as the application temperature and the ability to discharge heat that is generated during the fuel cell operation.

Although the apparatus of the present invention can comprise a single fuel cell, alternate embodiments can employ a plurality of fuel cells in a stack configuration as shown in FIG. 1. It is also possible to include bipolar plates in such a stack, whereby one side of the bipolar plate serves as the cathode for a first fuel cell and the other side of the bipolar plate acts as the anode for a second, adjacent fuel cell.

The cylindrical housing and open longitudinal bore depicted in FIG. 1 are especially useful when the fuel cell apparatus is to be used downhole in an oil or gas well, or in a subsea location adjacent to an offshore well. The cylindrical shape allows the apparatus to conform to the space available inside well casing or tubing, or inside a riser pipe of an offshore platform. The open longitudinal bore allows space for cable or downhole tools to pass up or down therethrough, without interfering with the operation of the fuel cell. An annular design of the fuel cell can also allow produced fluids to flow through the longitudinal bore. This fluid flow can be useful in assisting in the removal of heat generated within the fuel cell. The fuel cell may include other passageways therethrough, such as control line passageways that facilitate the routing of lines through the fuel cell to equipment mounted below the fuel cell.

Figure 2:
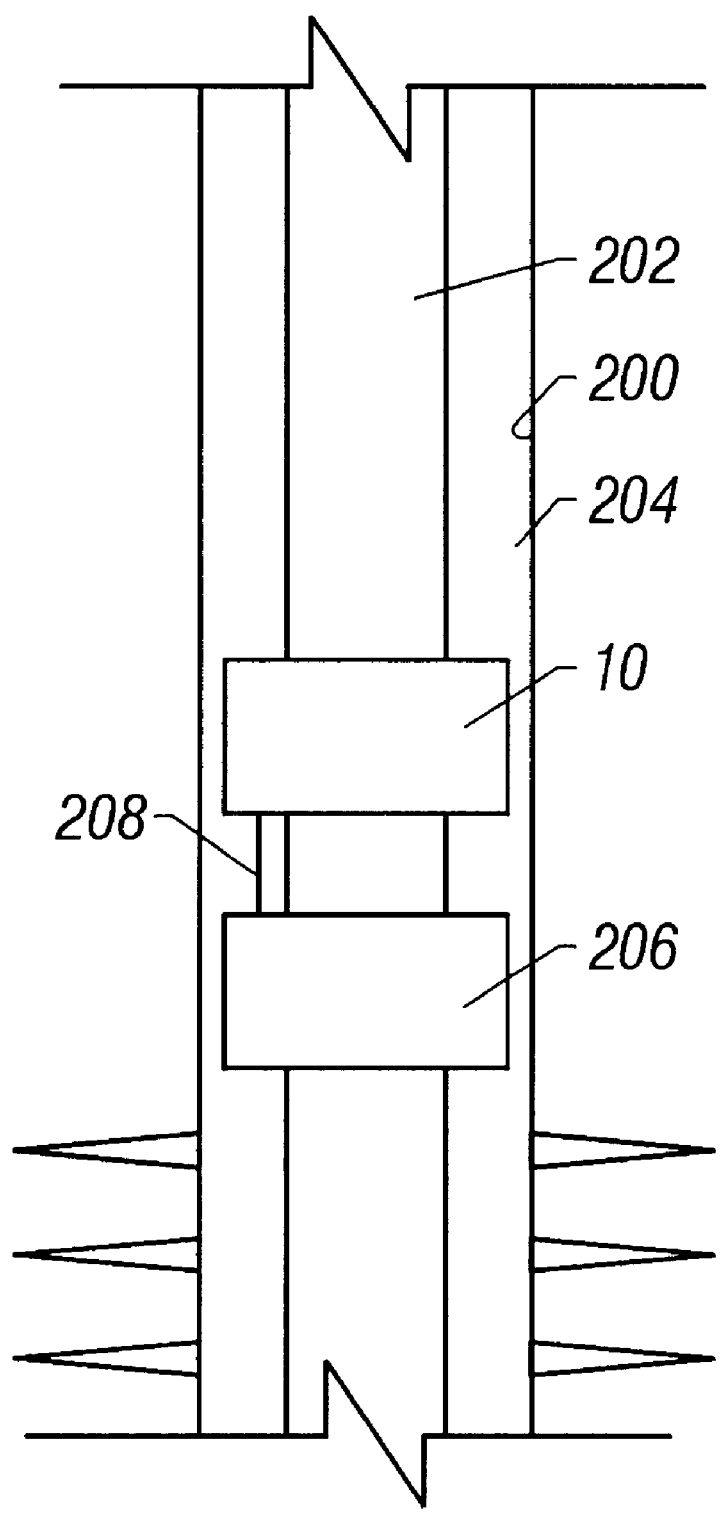
FIG. 2 is a schematic drawing showing a fuel cell in a wellbore.

FIG. 2 is a schematic diagram showing a fuel cell 10 in a well 200. A tubing string 202 extends into the well 200. The fuel cell is positioned in the well, would typically be attached to a tubing string and primarily residing in the annular space 204 between the production tubing and the well (which may include casing, a liner, or be open hole). Note that the fuel cell may also be used in wells that do not contain a tubing string. The fuel cell is in electrical communication with downhole equipment 206 such as by a communication line 208. As discussed, the downhole equipment may comprise any equipment positioned downhole that is capable of utilizing or that requires electricity. The heat generated by the fuel cell may also be used in some downhole environments (as in highly viscous, cool environments) and the downhole equipment includes devices that may use the generated heat.

Figure 3:
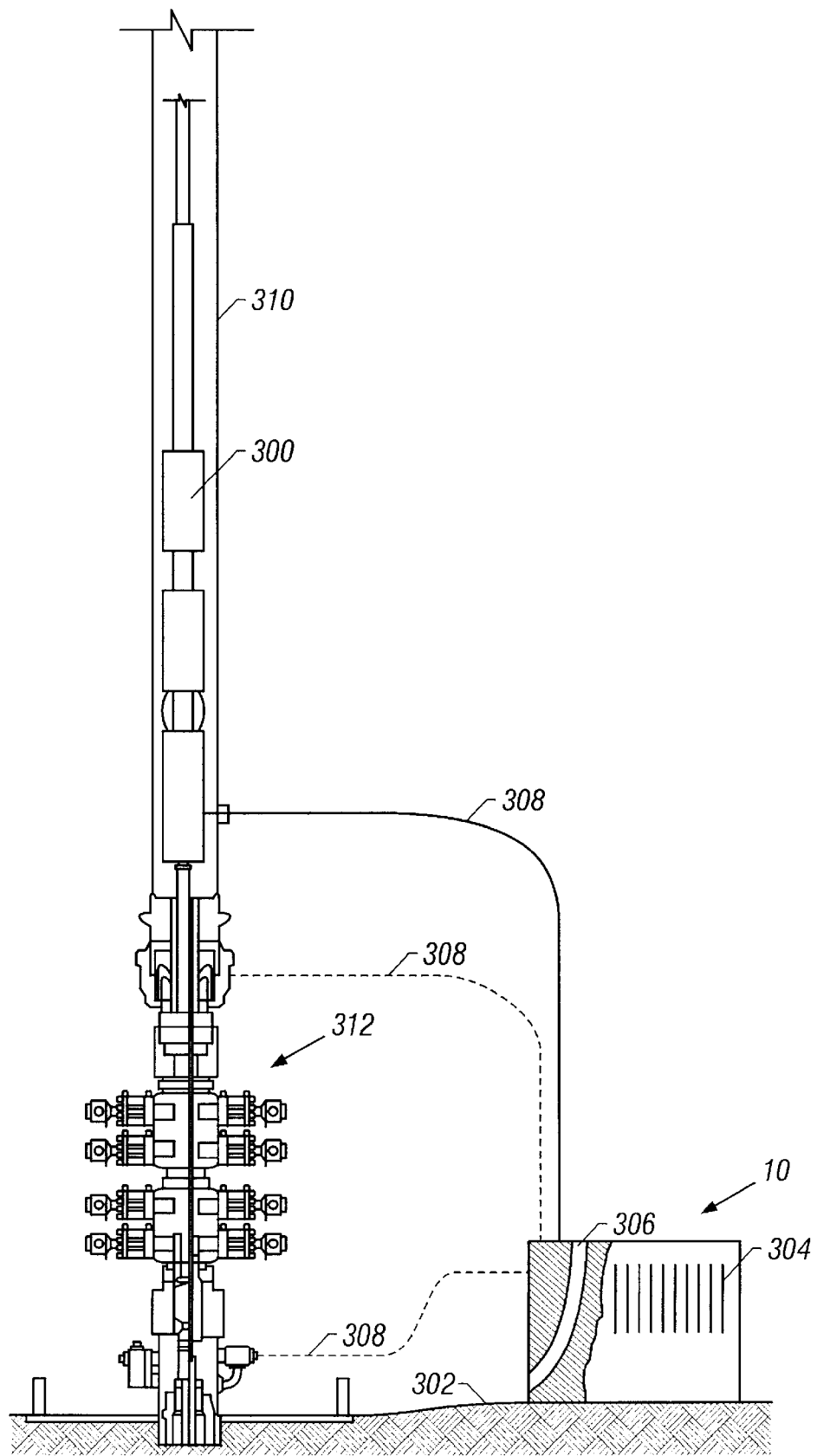
FIG. 3 is a schematic drawing showing a fuel cell positioned proximal a wellhead at the sea floor.

FIG. 3 shows an alternative embodiment in which the fuel cell is positioned near the sea floor 302 and connected to subsea well equipment 300 to power the equipment. In this embodiment the fuel cell is positioned external to the well. Placing the fuel cell outside of the wellhead allows the fuel cell to utilize the sea water to dissipate the heat generated by the fuel cell. Placing the fuel cell external to the well and utilizing the sea water to dissipate the heat from the fuel cell allows the fuel cell to achieve a greater power output because the heat generation and operating temperatures are better controlled than in a downhole environment.

Figure 5:
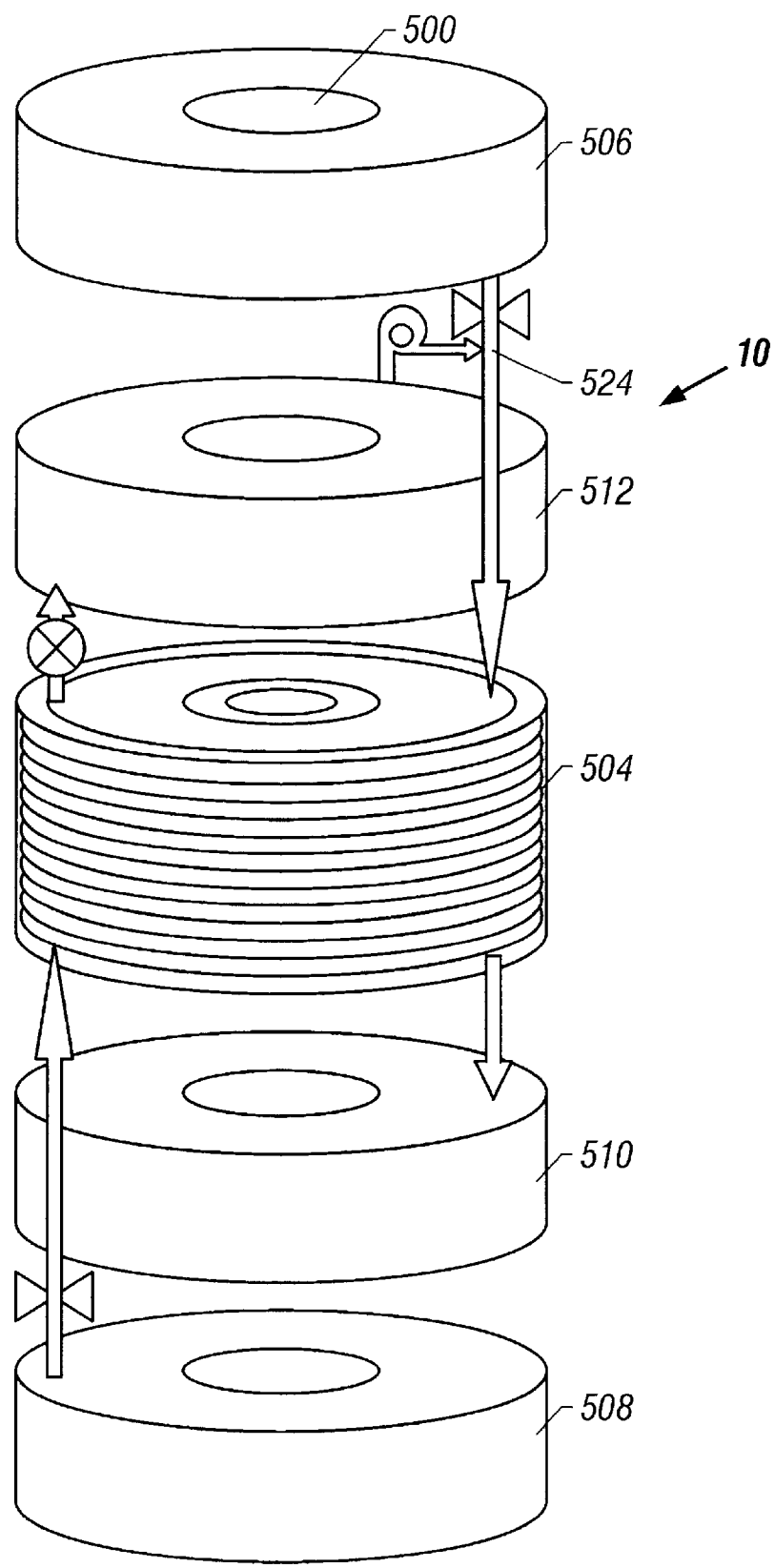
FIG. 5 is an exploded schematic of an alternative fuel cell.

To facilitate dissipation of the heat from the fuel cell, the fuel cell may incorporate various features, such as fins 304, circulating pumps (not shown), and flow passageways 306 through the fuel cell. In one embodiment, the fuel cell defines generally vertically-extending passageways 306 that are open to the sea at or near the top and the bottom. The cool sea water enters the passageway through the bottom end and rises as the fuel cell heats the sea water. The warmed sea water exiting the top end carries heat from the fuel cell, cooling the fuel cell. The vertical passageway could be an axial passageway 500 such as that shown in FIG. 5.

As shown in FIG. 3, the fuel cell 10 is electrically connected to the well equipment within the well or the riser via an electrical conductor 308 extending from the fuel cell, through the riser 310 or wellhead 312, and to the equipment. The equipment powered may be any type of equipment desired as discussed herein. Alternative paths for the routing of the electrical conductor 308 are shown as dashed lines also labeled 308.

Figure 4:
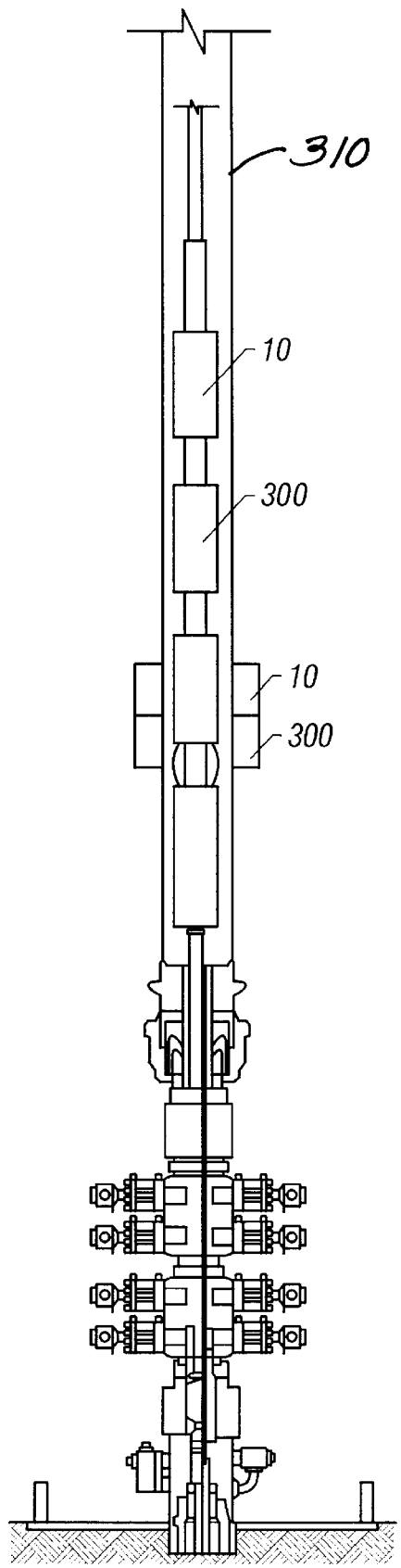
FIG. 4 is a schematic drawing showing a fuel cell positioned in a riser.

FIG. 4 shows another alternative embodiment in which the fuel cell 10 is placed in the subsea riser 310. This embodiment is similar to that of the downhole fuel cell in that the overall shape of the fuel cell is annular (or shaped to fit in an annulus) and defines a passageway therethrough or thereby that allows tools to pass through the riser, past the fuel cell, and into the well. Accordingly, the cross-sectional shape of the fuel cell could be annular, arcuate, or a portion of an arcuate shape (such as shaped like an arc) so that the fuel cell may fit within an annulus or otherwise reside outside of the well tool passageway (See FIG. 10). Note that cylindrical fuel cells may be useful in certain circumstances in the riser or downhole.

The embodiment of FIG. 4 may incorporate cooling passageways (not shown) therethrough to facilitate heat removal. The passageways may be plumbed to openings in the riser to allow seawater to flow into the riser, through the fuel cell cooling passageways, and back out of the riser into the sea. This flow may be accomplished using pumps or the natural tendency of the warmed seawater to rise or other mechanisms.

FIG. 4 also shows a fuel cell 10 connected to an exterior of a subsea riser 310. In the embodiment shown, the fuel cell 10 powers equipment 300 positioned outside the riser 310. The fuel cell and equipment may be annular or have some other shape that facilitates their attachment to the exterior of the riser 310. The fuel cell mounted to the exterior of the riser may also be used to power equipment within the riser with the appropriate electrical connections and may incorporate the cooling features previously mentioned in connection with the embodiment of FIG. 3.

FIGS. 5 through 8 disclose one possible embodiment of the fuel cell 10 for subsea or downhole use. The fuel cell comprises a fuel cell stack 504 as previously described, an oxygen supply 506, a hydrogen supply 508, and two water reservoirs (510, 512). As previously discussed, the oxygen and hydrogen supplies communicate with opposite sides of the fuel cell membranes.

One of the reservoirs, the first reservoir 510 is positioned below the fuel cell stack. At least a portion of the water produced in the reaction drains to the lower reservoir by action of gravity and capillary action.

Figure 8:
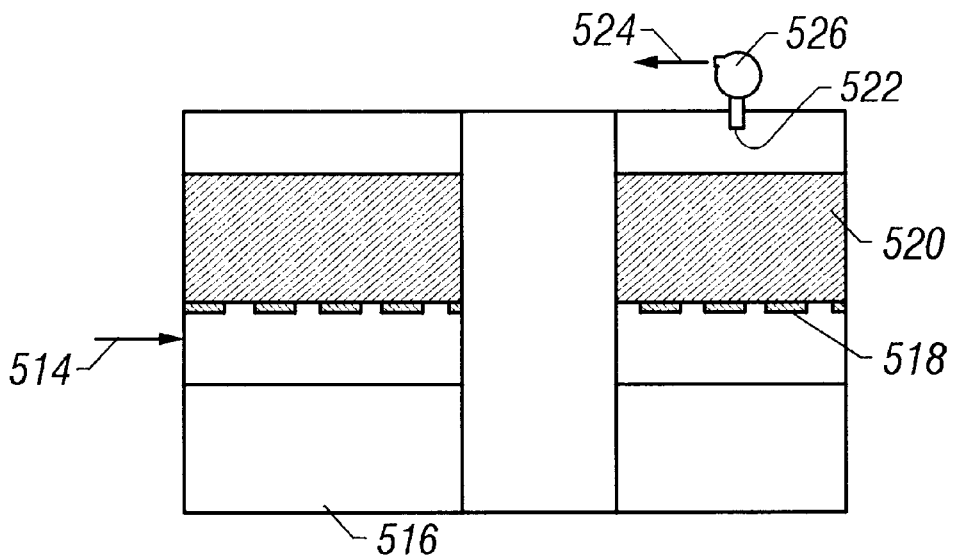
FIG. 8 is a schematic view of a second reservoir.

The second reservoir 512 is in fluid communication with the oxygen sides of the membranes with a check valve in the communication line to prevent flow from the reservoir to the fuel cell stack. FIG. 8 is a schematic diagram of the second reservoir. Steam, or wet oxygen, from the fuel cell stack enters the second reservoir via an inlet 514 at a position intermediate an internal water reservoir 516 and a filter screen 518, such as a stainless steel screen. The screen supports a desiccant 520 adapted to absorb water and other materials from the wet oxygen. An outlet 522 of the second reservoir, positioned on an opposite side of the desiccant from the inlet, communicates with the oxygen supply line 524 to the fuel cell stack. A pump 526 in the line between the outlet and the oxygen supply facilitates movement of the oxygen from the second reservoir to the fuel cell stack. In this way, water generated in the reaction is removed from the fuel cell stack. The first reservoir 510 and the second reservoir 512 can be adapted to serve as common reservoirs that are shared by numerous fuel cell stacks, the fuel cell stacks being combined to form a single power supply.

Figure 7:
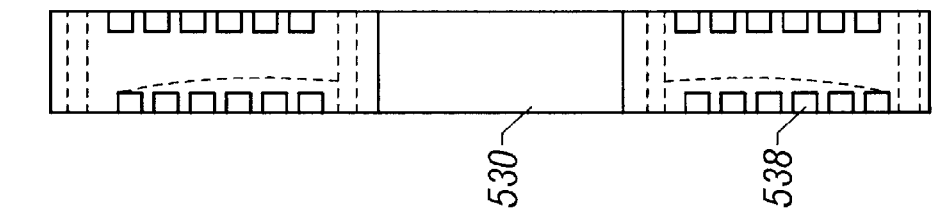
FIG. 7 is a side elevational view of a plate of a fuel cell.
Figure 6:
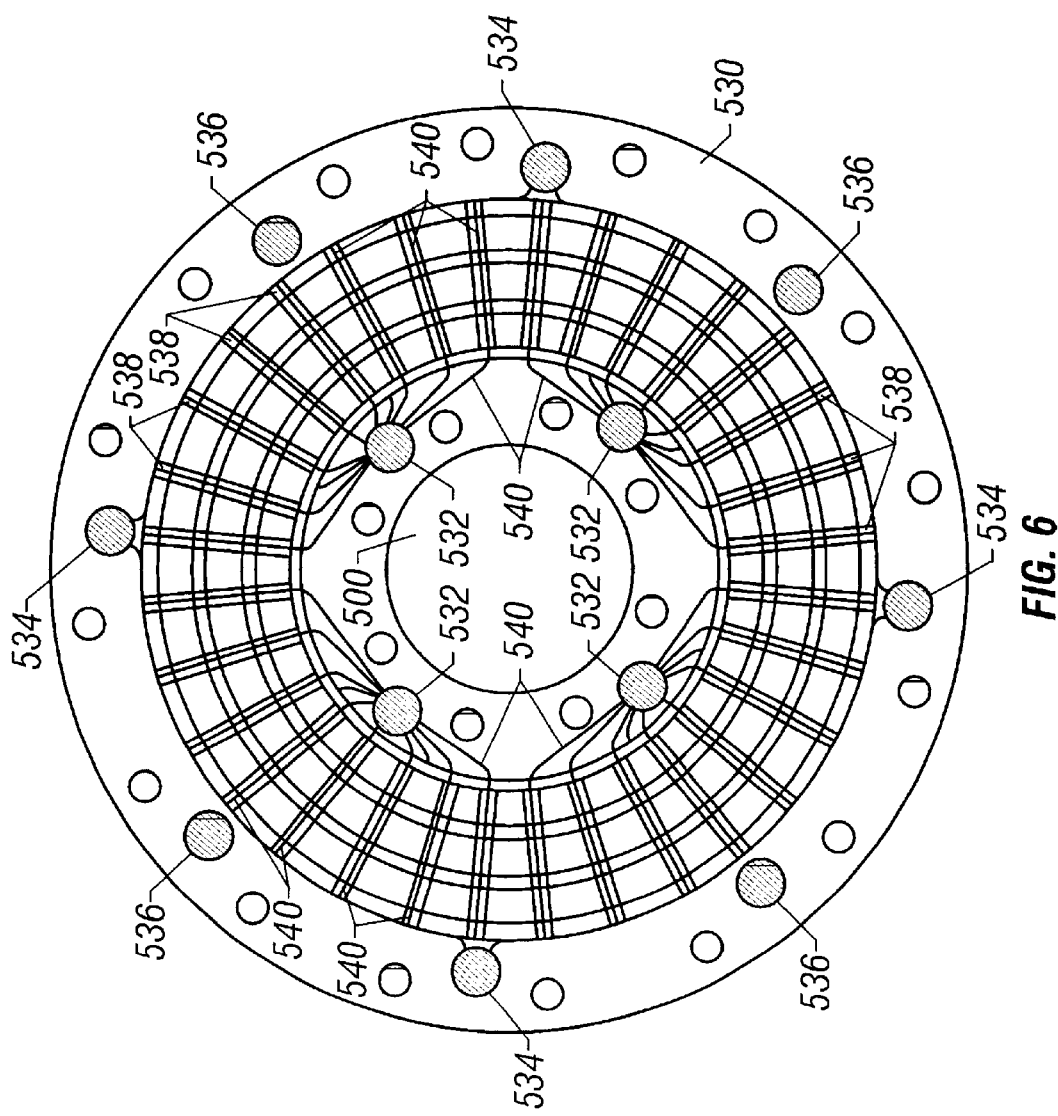
FIG. 6 is a top elevational view of a plate of a fuel cell.

To further facilitate water removal from the fuel cell stack, the anode plates 32, bipolar plates 34, and cathode plates 40 (referred to collectively as plates 530), include drain holes 532 communicating with at least one of the reservoirs. FIGS. 6 and 7 show a top (oxygen side) view and side view respectively of a representative plate. The plate has a plurality of spaced passageways for oxygen and hydrogen inlets (534, 536). A set of oxygen and water drain outlets 532 also extend through the plate and communicate with the reservoirs described above. The outlets can be positioned proximal the center of the plate as shown in the figure. Radial channels 538 formed in the plate facilitate movement of water on the surface of the plate toward the outlets. To further facilitate movement of the water, the channels or other portions of the plate may be coated with a hydrophobic material such as wax or grease. Capillary members 540, such as threads, may be placed in the radial channels and into the outlet to further facilitate movement of the water from the channel to the outlet.

Figure 9:
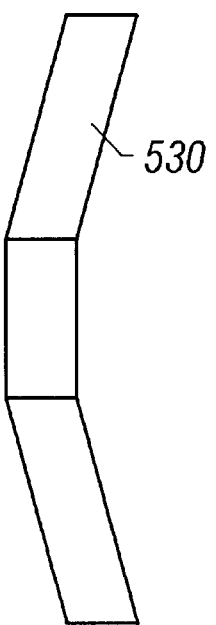
FIG. 9 is a side elevational view of a plate of a fuel cell.

The plate shown in FIG. 9 includes an additional modification to facilitate movement of the water to the outlets, namely a sloped, slanted, or angled surface. By using a frustoconical, conical, hemispherical, bowl-shaped, curved, or a surface that otherwise descends toward the outlets, gravity aids movement of the water (liquid) on the surface of the plate toward the outlets. FIG. 7 shows a plate in which only the surface having the radial channels is sloped.

Figure 11:
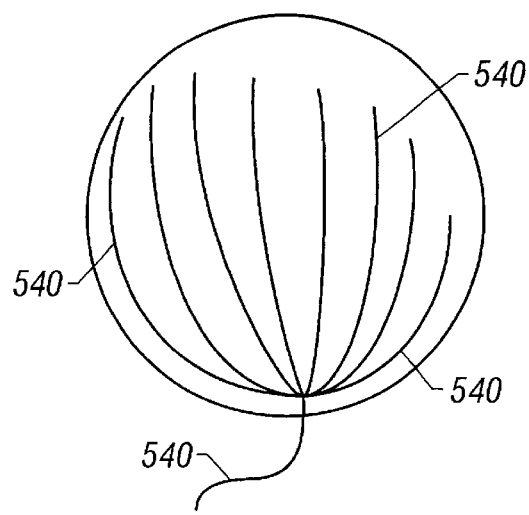
FIG. 11 is a top elevational view of an alternative membrane with capillaries thereon.

FIG. 11 discloses an alternative embodiment in which the capillary members are formed on the surface of the membrane. The capillaries radiate from one, or more, points that has a capillary member 540 which extends away from the surface to direct the water from the membrane surface to a water reservoir.

Figure 14:
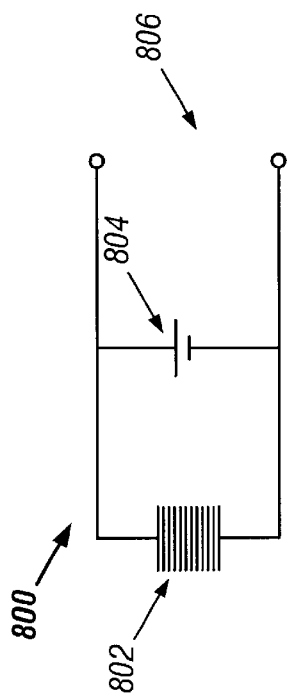
FIG. 14 is a simplified electrical schematic illustrating a fuel cell/battery hybrid power supply.

FIG. 14 shows one embodiment of the present invention as a hybrid power system shown generally as 800 comprising a fuel cell 802 and a rechargeable battery 804 that are electrically connected to provide power across a load 806. This combination can be adapted to be utilized in a downhole application. When coupled with a battery 804, the fuel cell 802 does not need to generate the maximum power output required for a short duration peak load. This hybrid system 800 is particularly suitable for multiple level power consumption requirements where a majority of time an average base level power requirement is needed and a relatively small amount of time there is a short-term peak power load. The rechargeable batteries 804 can be charged by the fuel cell 802 during the average power consumption periods and can be used to boost the output power during the high power consumption periods.

The hybrid system 800 may be able to reduce the size, weight and cost of the total power system by enabling a smaller fuel cell 802, in conjunction with a battery 804, to provide a required power demand 806.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A fuel cell, comprising:
   a fuel vessel that comprises a source of fuel;
   an oxidant vessel comprising a source of oxidant;
   a reaction zone that comprises at least one cathode, at least one anode, and electrolyte between each anode and cathode;
   a closed water vessel that is connected to the reaction zone by at least one capillary flow path;
   a fuel conduit that connects the fuel vessel and the reaction zone, and comprises a fuel pressure control apparatus adapted to maintain a static pressure of fuel in the reaction zone;
   an oxidant conduit that connects the oxidant vessel and the reaction zone, and comprises an oxidant pressure control apparatus adapted to maintain a static pressure of oxidant in the reaction zone; and
   electrical conductors connected to anode and cathode and adapted to conduct electricity to an external device.

2. The fuel cell of claim 1, wherein the fuel pressure control apparatus and the oxidant pressure control apparatus are pressure regulator valves.

3. The fuel cell of claim 1, wherein the water vessel is located within a cathode.

4. The fuel cell of claim 1, wherein the water vessel is located external to the reaction zone.

5. The fuel cell of claim 1, wherein neither fuel, oxidant, nor water dynamically flows in a closed loop through the reaction zone.

6. The fuel cell of claim 1, wherein the fuel cell comprises neither a fuel pump, an oxidant pump, nor a water pump.

7. The fuel cell of claim 1, wherein the reaction zone comprises as its only openings for fluid flow:
   at least one aperture connected to the fuel conduit for admitting fuel into the reaction zone;
   at least one aperture connected to the oxidant conduit for admitting oxidant into the reaction zone; and
   the at least one capillary flow path that connects the reaction zone to the water vessel.

8. The fuel cell of claim 1, wherein the static pressure in the reaction zone is high enough to cause any water vapor formed in the fuel cell to condense.

9. The fuel cell of claim 1, wherein the pressure in the reaction zone is between about 40–400 psig.

10. The fuel cell of claim 1, further comprising at least one additional fuel cell that comprises an anode, cathode, and electrolyte, wherein the fuel cells are arranged in a stack configuration.

11. The fuel cell of claim 10, comprising at least one bipolar plate that comprises the anode of one fuel cell in the stack and the cathode of an adjacent fuel cell in the stack.

12. The fuel cell of claim 11, wherein the bipolar plate comprises two substantially planar surfaces, the anode being located on one of the surfaces and the cathode being located on the other surface.

13. The fuel cell of claim 1, wherein the fuel cell is selected from the group consisting of a phosphoric acid fuel cell and alkaline fuel cell.

14. The fuel cell of claim 1, wherein the fuel cell is a proton exchange membrane fuel cell.

15. The fuel cell of claim 14, wherein the electrolyte comprises a polymer.

16. The fuel cell of claim 1, wherein the fuel vessel comprises a source of hydrogen gas.

17. The fuel cell of claim 16, wherein the fuel cell is a solid oxide fuel cell.

18. The fuel cell of claim 17, wherein the water vessel comprises a metal hydride material and is in communication with the at least one anode.

19. The fuel cell of claim 18, wherein the metal hydride material within the water vessel is capable of releasing hydrogen gas when contacted with water.

20. The fuel cell of claim 19, further comprising:
   a fuel recycle conduit that connects the water vessel to the fuel conduit.

21. The fuel cell of claim 17, wherein a fuel regeneration vessel is connected to the anode portion of the reaction zone by at least one flow path.

22. The fuel cell of claim 21, wherein the fuel regeneration vessel is capable of receiving produced water from the reaction zone through the at least one flow path.

23. The fuel cell of claim 22, wherein the fuel regeneration vessel comprises metal hydride material that is capable of reacting with water and producing hydrogen gas.

24. The fuel cell of claim 23, wherein the fuel regeneration vessel is connected to the fuel conduit by a regenerated fuel conduit.

25. The fuel cell of claim 24, wherein the fuel regeneration vessel comprises a pump capable of transporting hydrogen gas from the fuel regeneration vessel into the fuel conduit.

26. The fuel cell of claim 21, wherein the fuel regeneration vessel and the water vessel are the same vessel.

27. The fuel cell of claim 21, wherein the fuel regeneration vessel is located within the water vessel.

28. The fuel cell of claim 17, wherein the electrolyte comprises a solid ceramic.

29. The fuel cell of claim 1, wherein the fuel vessel comprises at least one metal hydride capable of releasing hydrogen gas.

30. The fuel cell of claim 1, wherein the oxidant vessel comprises oxygen gas at a pressure of at least 1,000 psig.

31. The fuel cell of claim 14, wherein the oxidant vessel comprises oxygen gas at a pressure of at least 5,000 psig.

32. The fuel cell of claim 1, wherein the fuel cell has a power output of at least about 1 watt for a period of more than one day.

33. The fuel cell of claim 1, further comprising: a housing which encloses at least part of the reaction zone and comprises a cylindrical outer wall.

34. The fuel cell of claim 33, wherein the housing further comprises a cylindrical inner wall which defines an open longitudinal bore in the fuel cell.

35. The fuel cell of claim 33, further comprising a downhole electrical device which is electrically connected to the fuel cell.

36. The fuel cell of claim 33, wherein the fuel cell is electrically connected to a battery to form a hybrid power source.

37. The fuel cell of claim 33, wherein the fuel vessel, oxidant vessel, reaction zone and water vessel are enclosed within the housing.

38. The fuel cell of claim 33, wherein the entire fuel cell is enclosed within the housing except for the electrical connectors.

39. The fuel cell of claim 33, wherein the fuel cell contains no internal moving parts.

40. A downhole assembly, comprising:
a downhole structure located in a subterranean borehole;
a fuel cell attached to the downhole structure, the fuel cell comprising:
    a fuel vessel that comprises a source of fuel;
    an oxidant vessel comprising a source of oxidant;
    a reaction zone that comprises at least one cathode, at least one anode, and electrolyte between each anode and cathode;
    a closed water vessel that is connected to the reaction zone by at least one capillary flow path;
    a fuel conduit that connects the fuel vessel and the reaction zone, and comprises a fuel pressure control apparatus adapted to maintain a static pressure of fuel in the reaction zone;
    an oxidant conduit that connects the oxidant vessel and the reaction zone, and comprises an oxidant pressure control apparatus adapted to maintain a static pressure of oxidant in the reaction zone;
    electrical conductors connected to anode and cathode and adapted to conduct electricity to an external device; and
a downhole electrical device which is electrically connected to the fuel cell.

41. The downhole assembly of claim 40, wherein the downhole structure comprises a drillstring.

42. The downhole assembly of claim 40, wherein the downhole structure comprises at least one of well casing or well tubing.

43. The downhole assembly of claim 40, wherein the fuel cell comprises no internal moving parts.

44. The downhole assembly of claim 40, wherein the fuel cell is electrically connected to a battery to form a hybrid power source.

45. A method for completing a wellbore comprising:
providing a fuel cell comprising:
    a fuel vessel that comprises a source of fuel;
    an oxidant vessel comprising a source of oxidant;
    a reaction zone that comprises at least one cathode, at least one anode, and electrolyte between each anode and cathode;
    a closed water vessel that is connected to the reaction zone by at least one capillary flow path;
    a fuel conduit that connects the fuel vessel and the reaction zone, and comprises a fuel pressure control apparatus adapted to maintain a static pressure of fuel in the reaction zone;
    an oxidant conduit that connects the oxidant vessel and the reaction zone, and comprises an oxidant pressure control apparatus adapted to maintain a static pressure of oxidant in the reaction zone; and
    electrical conductors connected to the anode and cathode and adapted to conduct electricity to an external device,
connecting the fuel cell to an electrical device; and
inserting the fuel cell and electrical device into the wellbore.

46. The method of claim 45, further comprising:
electrically connecting the fuel cell to a battery, forming a hybrid power source.

47. The method of claim 45, wherein the fuel cell defines at least one passageway therethrough.

48. The method of claim 47, further comprising:
producing formation fluids from the wellbore, the formation fluids flowing through at least one passageway defined by the fuel cell.

* * * * *